United States Patent [19]

Strachan

[11] Patent Number: 4,739,211

[45] Date of Patent: Apr. 19, 1988

[54] FORCE TRANSDUCER

[76] Inventor: John S. Strachan, 29 Gloucester Lane, Edinburgh EH3 6ED, Scotland

[21] Appl. No.: 3,982

[22] Filed: Jan. 16, 1987

Related U.S. Application Data

[63] Continuation of Ser. No. 715,136, Mar. 22, 1985, abandoned, which is a continuation-in-part of Ser. No. 653,978, Sep. 24, 1984, abandoned.

[30] Foreign Application Priority Data

Sep. 28, 1983 [GB] United Kingdom ............... 8325861

[51] Int. Cl.$^4$ ............................................ H01L 41/08
[52] U.S. Cl. .................................................. 310/321
[58] Field of Search ............... 310/321, 323, 316, 317, 310/319, 331, 332, 338, 339, 800

[56] References Cited

U.S. PATENT DOCUMENTS 3,733,890 5/1973 Landvogt .............................. 73/579
4,600,855 7/1986 Strachan ............................. 310/338

Primary Examiner—Mark O. Budd

[57] ABSTRACT

A force transducer device adapted to function in a system having electrical means to cause the device to oscillate at its natural resonant frequency and means to monitor said frequency, the device having an intermediate resilient member being capable of mechanically oscillating at a natural resonant frequency, at least two piezoelectric transducers mounted on said resilient member and means for connecting the transducer sheets into said system, is disclosed herein.

30 Claims, 3 Drawing Sheets

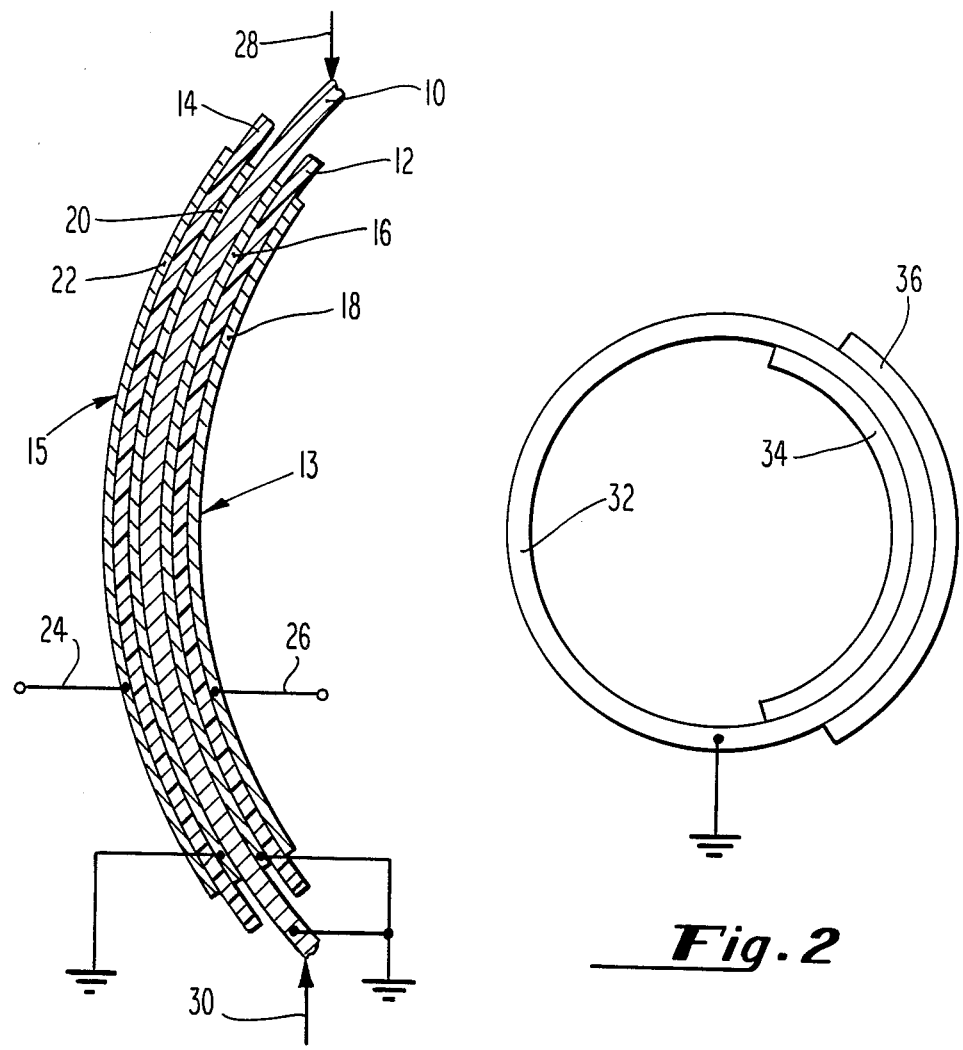
Fig. 1
Fig. 2
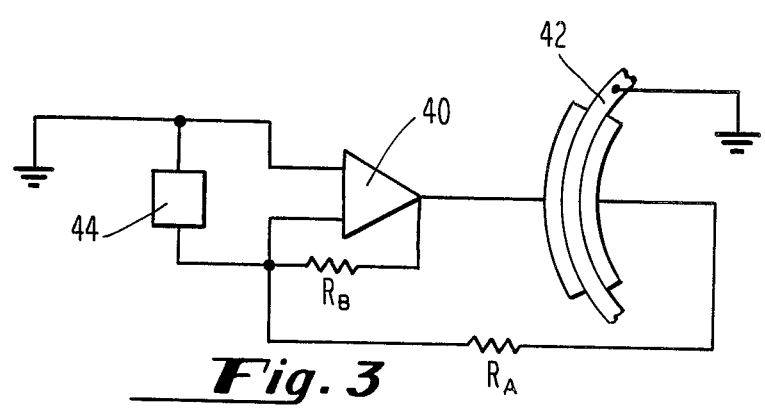
Fig. 3

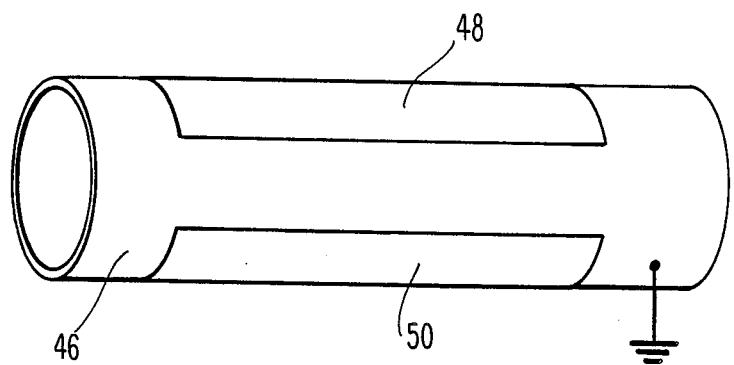
_Fig. 4a_
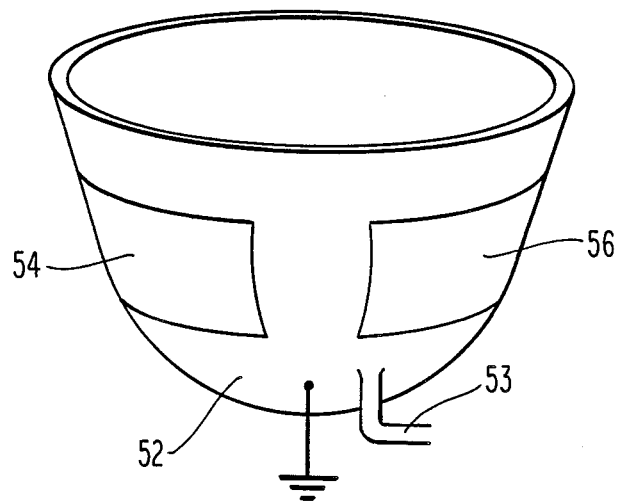
_Fig. 4b_

FORCE TRANSDUCER

This is a continuation of co-pending application Ser. No. 715,136 filed on Mar. 22, 1985 which is a continuation-in-part of Ser. No. 653,978 filed on Sept. 24, 1984, both now abandoned.

This invention relates to a force transducer in which an applied force is defined by the resonant frequency of a mechanical system. More particularly, it relates to a device for the accurate and reproducible measurement of changes in applied force which device incorporates piezoelectric transducers mounted on a resilient member capable of oscillating at a natural resonant frequency induced by the oscillation of one of the transducers and received by the other.

Force transducers and strain gauges of various constructions and utilizing piezoelectric material are known in the art. For example, U.S. Pat. No. 3,733,890 discloses a leaf spring which may be entirely or partially made of a piezoelectric material. A force is applied to the longer edges of the rectangular leaf spring, caused to vibrate by the piezoelectric material, to vary the resonating frequency thereof. U.S. Pat. No. 2,558,563 discloses a strain gauge consisting of a column subject to bending and thin crystal piezoelectric elements attached to opposite sides of the column whereby bending of the column produces measurable voltages across the crystal elements. U.S. Pat. No. 3,479,536 discloses a force transducer consisting of a beam of piezoelectric quartz, and electrical means to cause the beam to vibrate longitudinally at its natural frequency. A force applied to the beam will vary the frequency of vibration of the beam which variation is metered. A similar force transducer having a central piezoelectric crystal and electrical means to cause the crystal to vibrate is disclosed in U.S. Pat. No. 4,175,243. A tube-type, spring-mass device is disclosed in U.S. Pat. No. 3,489,161 for use as a frequency reference in fluidic systems. Fluid pressure within the tube causes a variation in the resonant frequency of the system which, in turn, causes a variation in the out-put signal of the device. A disclosure of the use of piezoelectric resin sheets or film having electroconductive coatings for detecting changes in vibrations in solid bodies is disclosed in U.S. Pat. No. 3,903,733.

The various devices utilizing ceramic or quartz type piezoelectric materials have a disadvantage in that the materials are inherently self resonant and, consequently, grossly reduce the accuracy of the force transducer system. Electromagnetic systems are also subject to the problem of self resonance but their main disadvantage is in the increased power required because of their inherently low impedance.

In accordance with this invention, there is provided a force transducer comprising a resilient member capable of oscillating at a natural resonant frequency and, when operative, having at least one curved major surface, at least one piezoelectric resin sheet contiguous with at least one surface of said resilient member, and an electroconductive layer contacting at least the outer surface of each resin sheet, with the proviso that when only one resin sheet is in contact with said resilient member at least two unconnected electroconductive layers contact at least the outer surface of said resin sheet, whereby an electric current supplied to at least one electroconductive layer will cause the resilient member to mechanically oscillate and the oscillating resilient member will cause at least one electroconductive layer to transmit a corresponding electrical oscillating current.

In addition to the force transducer device, there is provided a load cell system comprising an electrical amplifier, a force transducer including a resilient member capable of oscillating at a natural resonant frequency and having, when operative, at least one curved major surface, at least two piezoelectric transducers contacting at least one surface of said resilient member, said amplifier having its output attached to one of said transducers to oscillate said resilient member and its input attached to the other transducer, and means to monitor changes in electrical frequency connected to the input to said amplifier.

The invention will be further described with reference to the accompanying drawings, in which:

FIG. 1 is a schematic cross-section illustrating an embodiment of the device of the invention.

FIG. 2 is an end view illustrating an alternate embodiment of the inventions.

FIG. 3 is a diagrammatic view of the system of the invention.

FIG. 4a is a perspective view of a tube-type force transducer of this invention.

FIG. 4b is a perspective view of a vessel-type force transducer.

Figure 5A:
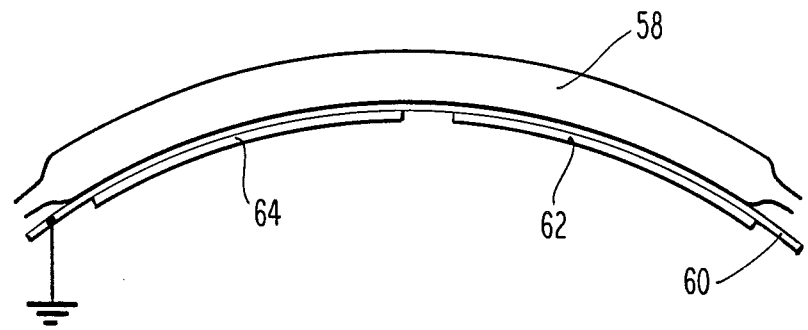
FIG. 5a is a side view of a plate-type force transducer associated with a bourdon tube.
Figure 5B:
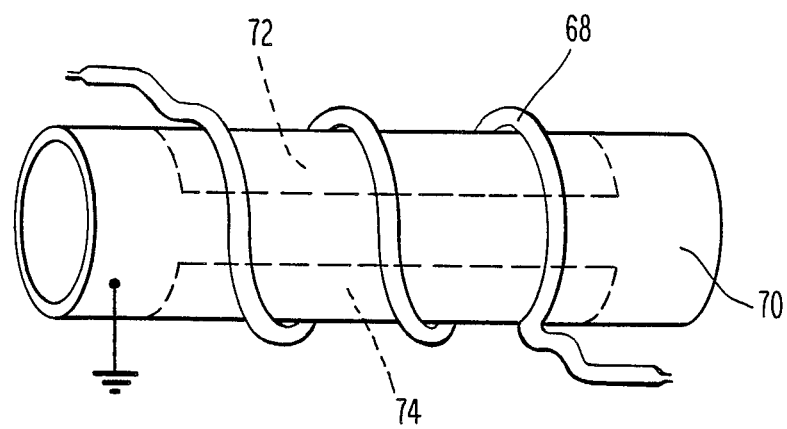
FIG. 5b is a perspective view of a tube-type force transducer associated with a bourdon spring.

In FIG. 1, an embodiment of the force transducer device is shown as having an intermediate plate- or beam-type resilient member 10, and piezoelectric resin films or sheets 12 and 14 fixed to both sides and in line with the major axis of the resilient member 10. Bonded to each side of piezoelectric resin film 12 are electroconductive layers or coatings 16 and 18 while similar electroconductive coatings 20 and 22 are bonded to film 14. Electroconductive leads 24 and 26 are shown attached respectively to outer coating 18 and outer coating 22. Inner coatings 16 and 20 are each grounded as is the resilient member 10. The entire assembly of film 12, conductive layers 16 and 18, and electroconductive leads is designated piezoelectric transducer 13 and the assembly of film 14, conductive layers 20 and 22, and electroconductive leads is designated piezoelectric transducer 15. Transducers 13 and 15 are adhesively attached to opposite surfaces of resilient member 10.

Piezoelectric transducers 13 and 15 can both be mounted on the same size of the plate-or beam-type resilient member 10. Alternatively, a single piezoelectric resin film mounted on one side of the resilient member can serve for both piezoelectric transducers by mounting or depositing at least two individual, unconnected electroconductive layers on the single film to permit the electroconductive laminated portions to function as individual transducers.

In operation, force can be conveniently applied to the device in the direction of arrows 28 and 30 or perpendicular thereto at the center of the device.

Resilient member 10, as shown in FIG. 1, is a planar material, curved in operation, but may be any generally elongated material curved in the lengthwise direction. The curved surface is required to assure that an applied force will bend the member in a fixed direction. The shape of the resilient member itself is preferably one which encourages one mode of vibration substantially over all others. The ratio of the length to width should be such as to not encourage oscillation in the width direction. The resilient member is usually a planar material or material having its major opposite surfaces in generally parallel planes, thus, when curved by bending forces, presenting one surface as convex and the opposite surface as concave. The curve is preferably the shape of an ellipse or circle or portion thereof. Resilient member 10 is usually a beam or tube of spring or carbon steel but may also be selected from other materials, for example, other metals or metal alloys, silicon, glass, plastics, hard rubber, bimetallic or other laminated material, and the like capable of oscillating in substantially one mode of vibration. The material for member 10 must have a high spring force with respect to its overall mass and should be capable of carrying a clean resonance relatively free of harmonics when oscillating. Oscillation in resilient member 10 must be capable of being mechanically induced by the vibrations of a piezoelectric resin transducer in contact therewith. There may be some advantage, depending upon the application or the material used for the resilient member, to stress the resilient member of the beam type with a spring in the tension mode allowing the system to be used over a wider range for the measurement of tensile forces. The use of the additional spring increases the frequency variation available across the range.

The piezoelectric resin sheets of this invention are preferably electrically polarized thermoplastic, thermosettable or curable resins capable of holding a stable piezoelectric charge. Examples of such resins taught in the prior art to be useful as piezoelectrics include polyesters, polyolefins, polyamides, poly(amino acids), polycarbonates, various cellulose derivatives, polyvinyl acetate, polystyrene, polyacrylonitriles, polyacrylates, polysulfones, polyvinylidene cyanide and poly(-halogenated olefins) e.g., vinylidene fluoride polymers, vinylidene chloride polymers, vinyl chloride polymers, vinyl fluoride polymers, tetrafluoroethylene polymers, chlorotrifluoreothylene polymers and the like. Such polymers include homopolymers and copolymers or terpolymers of the resins as well as resin mixtures or blends. Elastomeric resins impregnated with piezoelectric ceramic or other piezoelectric solid particles may also be used to prepare piezoelectric sheets. Preferred resins for the formation of piezoelectric elements are those nonelastomeric resins containing at least a major mole proportion of vinylidene fluoride in the polymer chain including, for example, vinylidene fluoride homopolymer and copolymers or terpolymers of at least 65 mol percent of vinylidene fluoride and at least one other copolymerizable monomer which preferably includes trifluoroethylene, tetrafluoroethylene, vinyl fluoride or mixtures of these comonomers. Vinylidene fluoride resins are conventionally produced by either suspension or emulsion polymerization procedures.

Extruded resin films or sheets may be unoriented, but also monoaxially oriented, biaxially oriented or multiaxially oriented by conventional means including blowing, stretching, rolling and combinations of these techniques. Resin films may be solvent cast either as unsupported articles or directly upon the resilient member which has first been treated by etching to effect firm bonding.

Films and sheets of the piezoelectric resin are usually coated on one or both sides with conductive materials e.g., aluminum, zinc, gold, tin, chrome, nickel and the like by vapor deposition, electroplating, painting, sputtering, laminating and the like.

A typical piezoelectric resin transducer comprises a poled, uniaxially oriented poly(vinylidene fluoride) resin film having a thickness of between 8 to 200 microns and an aluminum coating of a thickness ranging from 500 to 1500 Angstroms deposited thereon. The poled film will typically demonstrate strain coefficients $d_{31}$, $d_{32}$ and $d_{33}$, respectively, of at least 20, 3 and $-25$ micrometers/volt. Piezoelectric-forming vinylidene fluoride polymers have extremely wide band, wide dynamic range material with low electrical loss and, therefore, are easy to control in electrical circuits that require high accuracy.

One of the great advantages of the present invention utilizing piezoelectric elements comprising resin sheets having electroconductive layers thereon as transducers as compared, for example, to piezoelectric ceramic or electromagnetic means to drive the resilient member is that these other means of excitation are intrinsically self-resonant or have a relatively difficult to control energy distribution. The resin transducers of this invention permit the facile control of energy transmission to the resilient member which may be of an odd shape or size or which has been curved, bent or shaped to facilitate its use in specific applications and/or to reduce harmonics when resonating. The piezoelectric resin film and its electroconductive layer will more readily conform to the shape of the resilient member and may be easily manufactured to dimensions which will accommodate the size and shape of the resonating member.

Furthermore, the piezoelectric resin sheet may be tailored to control the direction of the transmit and receive signals to and from the resilient member. The strain coefficients $d_{31}$, $d_{32}$ and $d_{33}$ represent the three axes of the three dimensional piezoelectric sheet where $d_{31}$ and $d_{32}$ are perpendicular coefficients in the same plane representing, respectively, the machine and transverse directions as the sheet is manufactured and $d_{33}$ is a coefficient perpendicular to both $d_{31}$ and $d_{32}$ and extending perpendicularly through the plane surface of the sheet. The $d_{31}$ and $d_{32}$ constants can, by virtue of their manufacture, be the same or substantially different values and the direction of the piezoelectric resin sheets may be aligned so that a particular strain constant will match a particular dimension of the resilient member thereby regulating the signal accuracy and noise.

In many embodiments of the force transducer of this invention, the piezoelectric resin sheet is preferentially uniaxially oriented to provide a $d_{31}$ value, after the electrical poling process, substantially in excess of the $d_{32}$ value. This sheet is then cut and positioned in relation to the resilient member so that the $d_{31}$ axis of the sheet runs in the direction of the bend or curve in the resilient member thereby inducing the member (plate or tube) to resonate in the direction of the curve.

The attachment of the piezoelectric transducers 13 and 15 to the resilient member is readily accomplished by adhesive means such as two-sided adhesive tape, liquid adhesive or the like. If desired, insulating sheets can be fixedly mounted between the resilient member 10 and the piezoelectric transducers 13 and 15 in a conventional manner. With this insulation arrangement, the ungrounded leads from transducers 13 and 15 may be located on the inner electroconductive layers adjacent resilient member 10.

The piezoelectric resin sheet may have a pattern of electroconductive coatings deposited thereon so that a single resin sheet may act as the base for multiple transducers represented by each electroconductive coating. One or more of such transducers may serve as the transmitter and one or more may serve as the receiver. The conductive coating pattern may be matched on both surfaces of the resin sheet, if necessary.

In another embodiment (not shown) of the force transducer device of this invention, where the resilient member 10 is an electroconductive material such as steel, inner electroconductive layers 16 and 20 may be omitted from transducers 13 and 15 and the resilient member 10 utilized as the ground for the transducers. This may be effected by use of an electroconductive adhesive in conjunction with a preformed piezoelectric film, or a piezoelectric film may be solvent cast directly to the steel resilient member 10.

In FIG. 2, another embodiment of the force transducer device comprising a ring or, in extended form, a pipe or tube member 32 is shown. Piezoelectric transducers 34 and 36, corresponding generally to the transducers 13 and 15 of FIG. 1, are affixed to the inner and outer surfaces, respectively.

A system, which is preferably used for the operation of this invention, is shown in FIG. 3 wherein the output of amplifier 40 is connected to one of the piezoelectric transducers of the force transducer generally designated as 42. Amplifier 40 is reasonably wideband with a low phase shift and high gain, the gain being set by the ratio of the resistances shown in FIG. 3, $R_B/R_A$. The signal emanating from the force transducer 42 is monitored by a frequency counter 44 which may be, for example, a microprocessor.

In operation, an electrical impulse is delivered to a piezoelectric transducer which may be on the concave or convex surface of the resilient member 10. This is accomplished, for example, by means of a D.C. current flow from a high gain amplifier into the piezoelectric transducer 15. The electrical impulse causes the transducer to oscillate at a rate which induces the resilient member to oscillate at its natural or characteristic resonance frequency at which time the entire assembly oscillates at this frequency. The mechanical oscillating frequency of the resilient member will be translated by the piezoelectric transducer 13 on the opposite side of the resilient member 10 to a corresponding electrical frequency which is counted, for example, by a frequency counter unit monitoring the amplifier-force transducer circuit. When a force is applied to the resilient member serving to vary the oscillating frequency of the force transducer device, the variation will be metered and translated into a force measurement. A frequency variation of 30% or more for full scale deflection can be achieved, with stability (reproducibility) better than 0.1%.

In one embodiment of this invention (not shown in the drawing), the resilient member 10 is a member consisting of at least two slabs of laminated material, preferably metal, having different rates of thermal expansion but which member oscillates in a substantially single vibrational mode. When the force transducer utilizing this laminated member is subjected to a temperature change, rather than a force variation, the resilient laminated member will bend and vary the oscillating frequency of the force transducer. This variation will be monitored as in the case of the application of force to the resilient member and the variation translated to a temperature change.

The force transducer of this invention can be used in any situation where a force is to be measured. A number of similar piezoelectric transducers may be used with a single resilient member and the results averaged.

In FIG. 4a, an embodiment of the force transducer wherein tube 46 having piezoelectric film transducers 48 and 50 mounted around the outer surface, is shown. This embodiment can be modified by having both transducers mounted on the inner wall of the tube or one transducer mounted on the inner wall and one on the outer wall, as desired for any particular application. The walls of tube 46 can be of varying thickness, if required, and one or both ends of the tube may be partially closed (reduced) to restrict fluid flow.

In a particular embodiment with an application in monitoring pipe seals in critical environments, a rubber material of relatively high spring force and low acoustic loss is used as a pipe or block (representing the resilient member) and the piezoelectric transducers are mounted in parallel around the pipe or block surface, the frequency of the system being varied by an increase in pressure on the rubber walls caused by fluid passing through the pipe.

In FIG. 4b, the force transducer is shown as an open vessel 52 having outlet 53 and transducers 54 and 56 mounted on the outer wall. Fluid pressure changes within the vessel can be readily monitored.

In another embodiment shown in FIG. 5a, a bourdon tube through which a fluid is caused to flow is shown at 58. The bourdon tube is secured to a plate-type force transducer 60 having both the driving transducer 62 and receiving transducer 64 mounted on the underside. In operation, varying the pressure of the fluid flowing through the bourdon tube will cause it to straighten. The change in the arc of the curved tube will be translated to the plate-type force transducer which, in turn, varies its resonant frequency and indicates a pressure change.

In FIG. 4b, a bourdon spring 68 is wrapped about a tube-type force transducer comprising tube 70 and piezoelectric resin film transducers 72 and 74 mounted on the inner wall of the tube. As fluid pressure is increased within the tube of the bourdon spring the spring tightens around the tube 70 causing a variation in resonant frequency and an accurate indication of the pressure change within the tube of the bourdon spring.

An important feature of the invention is that the spring force of the resilient member should be high with respect to its overall mass. This results in an important characteristic of the invention, namely its immunity to temperature variation, since the frequency being monitored is defined by the restricting force of the resilient member and the mass of such member, and in this embodiment the force is the quantity being measured.

Temperature has little effect on the output except in so far as it varies the effective mass of the oscillating resilient member. This affords the opportunity of manufacturing extremely inexpensive, highly accurate devices, the limitations being the stability of the amplifier and the accuracy of frequency measurement.

The resonant frequency of the force transducer device is proportional to the square root of the ratio of the total tension (spring strength plus applied force) to the effective mass of the device, thus providing an easily calibrated mechanism.

In another embodiment of the invention, the device can be used for the measurement of linear displacement or position change. In this form, the mass of displacement is positioned at right angles and perpendicular to the plane of the resilient member and applied on one end of said member. The displacement in this case is, of course, directly affected by the temperature and correction is required if high accuracy is desired. Nevertheless, as this invention provides a low cost high resolution device, it has many applications such as in joy sticks and position sensing in robotics applications.

In a specific embodiment of the force transducer device and system of this invention, a generally rectangular, 0.05 cm. thick, planar piece of spring steel (ASTM carbon steel, 0.7–0.8 wt. % carbon, 0.5–0.8 wt. % manganese, rolled to 250,000 psi) serves as a resilient member similar to that shown as member 10 of FIG. 1 of the drawing. At each end, in the lengthwise direction or longest dimension of the resilient member, is a centrally located, integral tab portion used to attach the force transducer to means for subjecting the device to a force generally along its longitudinal axis, for example, by application of weight in a scale mechanism. The overall length of the resilient member, including the tabs, is 10.6 cm. and the tab portions are each 1 cm. in length and 2 cm. in width thereby leaving an intermediate portion of the member for oscillation which measures 8.6 cm. in length and 4 cm. in width.

Centrally fixed to the front and back or opposite major surfaces of the resilient member and longitudinally aligned therewith are piezoelectric transducers generally corresponding to those shown at numerals 13 and 15 of FIG. 1. These transducers consist of electrically poled poly (vinylidene fluoride) film of a thickness of about 15 micrometers (microns) and having strain coefficients $d_{31}$, $d_{32}$ and $d_{33}$ respectively of 25, 5 and −32 (KYNAR ® piezofilm available from Pennwalt Corporation). The mechanical 1 ($d_{31}$) axis of the film is parallel to the longitudinal axis of the resilient member. On each side of the transducer film is a vapor deposited coating of aluminum having a thickness of about 1000 Angstroms. The transducers are rectangular and have a length of about 8 cm. and a width of about 2.5 cm. On each of the aluminum coatings, electrical leads are attached. The transducers are secured to the resilient member by means of double-sided adhesive tape.

The entire force transducer assembly is curved in the longitudinal direction as shown in side view in FIG. 1 of the drawing. The shape of the curve is a portion of the circumference of a circle having a radius of between 10 and 20 cm.

The electrical leads from the inner aluminum coatings (coatings adjacent resilient member) of both transducers are connected to ground as is a lead affixed to the steel resilient member. The lead from the outer aluminum coating on the convex transducer is connected to the output from an amplifier and the lead from the outer aluminum coating of the concave transducer is connected to the input of said amplifier. The amplifier has an overall gain of about 5000 to 30,000 at a suitable frequency depending on the resonant frequency of the resilient member and is powered by an appropriate power supply (e.g. a 9 volt battery).

In operation, the amplifier sends an electric signal to the convex piezoelectric transducer or receiver which oscillates and causes the attached resilient member to mechanically oscillate in a substantially single vibrational mode at its characteristic or normal resonating frequency. The resilient member influences the piezoelectric transducer or transmitter attached to its concave side to vibrate at the same frequency and, because of its piezoelectric properties, the transducer transmits an electrical signal back to the amplifier. A commercially available electronic counter is attached to the amplifier input lead to meter the frequency of the system. When a force is applied to the force transducer (along its longitudinal axis) the oscillating frequency of the device changes and the change is monitored by the frequency counter.

I claim:

1. A load cell comprising an electrical amplifier, a force transducer including a resilient member capable of oscillating at a natural resonant frequency and, when operative, having at least one curved major surface, at least two piezoelectric resin sheet transducers mounted on one or more surfaces of said resilient member, said amplifier having its output attached to at least one of said transducers to thereby oscillate said resilient member and its input attached to at least one other of said transducers to thereby receive electrical frequency signals from such transducer, and means to monitor changes in electrical frequency connected to the load cell circuit.

2. The load cell of claim 1 wherein at least one of said transducers comprises a piezoelectric resin sheet mounted on said curved major surface, an electroconductive layer contacting at least the outer surface of said resin sheet, and an electrical lead attached to said layer.

3. The load cell of claim 2 wherein said transducers all comprise piezoelectric resin sheets, an electroconductive layer contacting at least the outer surface of each of said resin sheets, and an electrical lead attached to said layer.

4. The load cell of claim 3 wherein the amplifier output is attached to the outer surface of one of the transducers and the amplifier input is attached to the outer surface of the outer transducer.

5. The load cell of claim 3 wherein said piezoelectric resin sheet is vinylidene fluoride homopolymer or a copolymer of at least 65 mole percent vinylidene fluoride and at least one other copolymerizable monomer.

6. The load cell of claim 1 wherein said resilient member is a tube.

7. The load cell of claim 6 wherein means are provided to supply a fluid for passage into said tube.

8. The load cell of claim 2 wherein said resilient member is a tube and said transducers are mounted on the outer surface of said tube.

9. The load cell of claim 8 wherein means are provided to supply a fluid for passage into said tube.

10. The load cell of claim 9 wherein said piezoelectric resin sheet is vinylidene fluoride homopolymer or a copolymer of at least 65 mol percent vinylidene fluoride and at least one other copolymerizable monomer.

11. The load cell of claim 10 wherein said copolymerizable monomer is selected from the group consisting of trifluoroethylene, tetrafluoroethylene, vinyl fluoride and mixtures thereof.

12. A force transducer comprising a resilient member capable of oscillating at a natural resonant frequency and, when operative, having at least one curved major surface, at least two piezoelectric resin sheets each contiguous with at least one surface of said resilient member, and an electroconductive layer contacting at least the outer surface of each said resin sheets whereby an electric current applied to at least one of said electroconductive layers will cause said resilient member to mechanically oscillate and the oscillating resilient member will cause at least one other electroconductive layer to transmit an electrical current corresponding to said mechanical oscillation.

13. The transducer of claim 12 wherein said piezoelectric resin sheets are films of vinylidene fluoride homopolymer or copolymer of at least 65 mole percent vinylidene fluoride and at least one other copolymerizable monomer.

14. The transducer of claim 13 wherein at least one of said piezoelectric sheets is in contact with the curved surface of said resilient member.

15. The transducer of claim 14 wherein at least one piezoelectric resin sheet is in contact with a surface opposite said curved surface.

16. The transducer of claim 14 wherein said resilient member has opposite major curved surfaces in parallel.

17. The transducer of claim 16 wherein at least two of said piezoelectric resin sheets are continguous with the same surface of said resilient member.

18. The transducer of claim 16 wherein at least one of said piezoelectric resin sheets is continguous with one of said surfaces and another of said piezoelectric resin sheets is continguous with the opposite surface.

19. The transducer of claim 16 wherein said electroconductive layers are vapor deposited metal coatings.

20. The transducer of claim 16 wherein said resilient member is a material selected from the group consisting of steel, hard rubber, synthetic plastic, silicon and glass.

21. The transducer of claim 16 wherein said resilient member consists of laminated slabs each having different rates of thermal expansion.

22. The transducer of claim 16 wherein said sheets are films of a copolymer of at least 65 mole percent vinylidene fluoride and a monomer selected from the group consisting of trifluoroethylene, tetrafluoroethylene, vinyl fluoride and mixtures thereof.

23. The transducer of claim 16 wherein said resilient member is a ring or pipe.

24. A force transducer comprising a resilient member capable of oscillating at a natural resonant frequency and, when operative, having at least one curved major surface, a piezoelectric resin sheet contiguous with at least one surface of said resilient member, and at least two separate electroconductive layers contacting a surface of said resin sheet whereby an electric current applied to at least one of said electroconductive layers will cause said resilient member to mechanically oscillate and the oscillating resilient member will cause at least one other electroconductive layer to transmit an electrical current corresponding to said mechanical oscillation.

25. The transducer of claim 24 wherein said piezoelectric resin sheet is a film of vinylidene fluoride homopolymer or copolymer of at least 65 mole percent vinylidene fluoride and at least one other copolymerizable monomer.

26. The transducer of claim 25 wherein said other copolymerizable monomer is selected from the group consisting of trifluoroethylene, tetrafluoroethylene, vinyl fluoride and mixtures thereof.

27. The transducer of claim 25 wherein said resilient member has opposite major curved surfaces in parallel.

28. The transducer of claim 24 wherein said electroconductive layers are vapor deposited metal coatings.

29. The transducer of claim 27 wherein said resilient member is a ring or pipe.

30. The transducer of claim 27 wherein said resilient member is a material selected from the group consisting of steel, hard rubber, synthetic plastic, silicon and glass.

* * * * *